Patented Aug. 16, 1932

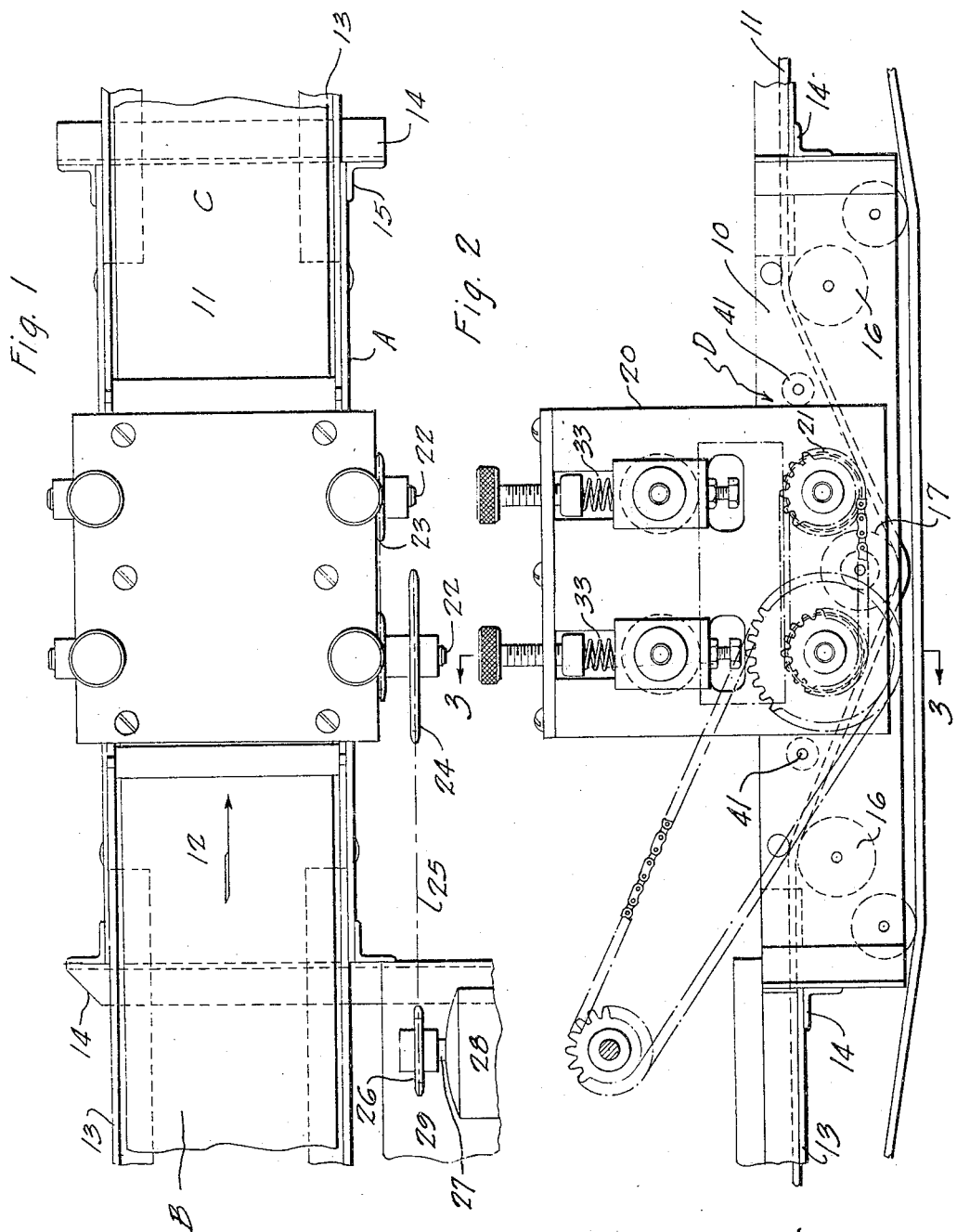
Aug. 16, 1932.  C. S. JENNINGS  1,871,996
CONVEYER MECHANISM
Filed July 1, 1930   2 Sheets-Sheet 1
INVENTOR
CHESTER S. JENNINGS
by Roberts, Cushman & Woodbury
ATTYS

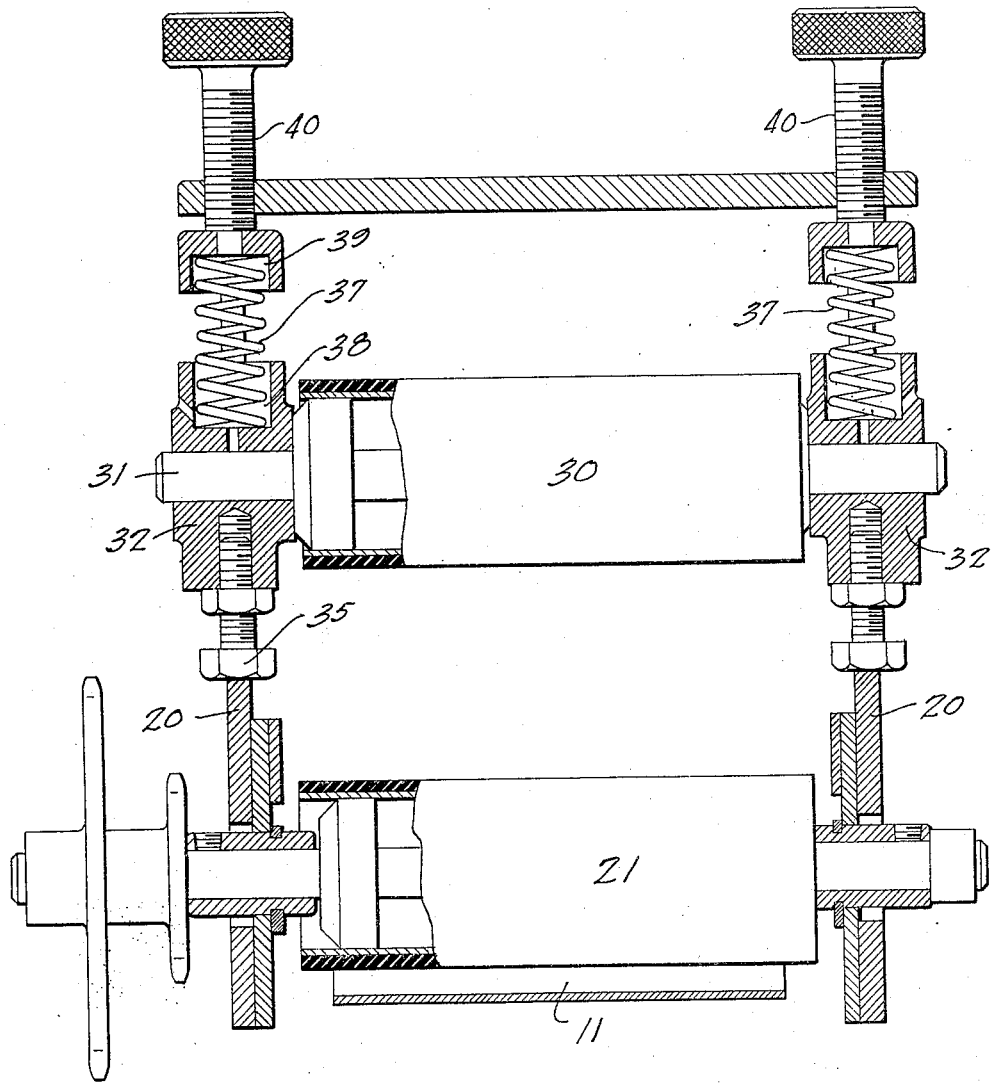

1,871,996

UNITED STATES PATENT OFFICE

CHESTER S. JENNINGS, OF SYRACUSE, NEW YORK, ASSIGNOR TO THE LAMSON COMPANY, OF SYRACUSE, NEW YORK, A CORPORATION OF MASSACHUSETTS

CONVEYER MECHANISM

Application filed July 1, 1930. Serial No 465,098.

This invention relates to an improvement in a conveyer mechanism and more particularly to means for spacing articles along a conveyer guideway in order to permit manipulation thereof.

The primary object of this invention is to provide in a conveyer system, a guideway having article-transporting means, spacing or dwell stations to which the articles are delivered and from which they are despatched by such means, and spacing mechanism at such stations whereby the speed of articles is changed so that when despatched from the stations they are at least a predetermined distance apart.

Other objects will appear from the following specification taken in connection with the drawings which form a part thereof and in which:

Fig. 1 is a plan view of a portion of a conveyer system equipped with one embodiment of this invention Fig. 2 is a side elevation thereof; and Fig. 3 is an enlarged sectional view taken along the line 3—3 of Fig. 2.

In the embodiment selected for illustration the articles travel in a conveyer guideway A having article-transporting sections B and C separated by a spacing station D. The guideway A comprises a pair of side plates 10 suitably supported and between which travels a conveyer belt 11 in the direction indicated by the arrow 12 in Fig. 1. The upper run of the belt 11 is supported upon flanged-side rails 13 which rest upon angle bars 14 suitably supported on uprights 15. At the end of each pair of side rails 13 are mounted freely rotatable rollers 16 over which the belt 11 passes. Intermediate the rollers 16 is provided a third freely rotatable roller 17 below which the upper run of the belt passes, so that a portion of the belt is depressed below the path of travel of the articles.

Suitably supported in vertically opposed plates 20 are a pair of driven rollers 21, the upper surfaces of which are in the path of travel of the articles. The shafts 22 of the rollers are connected by a sprocket and chain 23 so that they rotate as a unit. On the shaft 22 of the roller at the left in Figs. 1 and 2 is mounted a sprocket 24 driven by a chain 25 from a sprocket 26 on a shaft 27 of a motor 28 suitably supported on a platform 29. Mounted between the plates 20 above the rollers 21 are rollers 30, the shafts 31 of which are supported in floating bearings 32, adapted to reciprocate in slots 33 in the plates 20.

The bearings 32 are provided with adjustable set screws 35, the heads of which normally rest upon the lower edges of these slots 33, being held in such a position by the action of springs 37. One end of each spring 37 rests in a pocket 38 provided in its bearing 32 and the other end rests in a cup 39 carried by a set screw 40. Obviously by adjusting the set screws 35 the normal distance between the rollers 21 and 30 can be determined, and by adjusting the set screws 40 the tension of the spring 37 can be regulated. Positioned between each roller 21 and its adjacent roller 16 may be provided freely turning rolls 41, which act to support the articles as they travel to and from the spacing station D.

The belt 11 is driven at a predetermined speed by any suitable means (not shown) and the articles advance thereover in the direction indicated by the arrow 12 passing onto the left roller 41 and thence between the left pair of rollers 21 and 30. The set screws 35 are so adjusted that the distance between the rollers is less than the height of the articles to be treated, and as a result the introduction of the forward end of the article forces the rollers 30 upwardly against the springs 37 so that the bottom of the article is yieldably held in contact with the rollers 21. The rollers 21 are, as pointed out, both positively driven and the article continues its travel at the speed imparted by these rollers to the section C of the guideway. The rollers 21 are driven at a different rate of speed from that of the belt 11 and consequently when an article is returned to section C it will at least be a predetermined distance behind the preceding article and will remain in such a position, so that when the articles arrive at the station (not shown) where they are to be manipulated they can be treated individually without difficulty.

While in the embodiment herein shown and described the articles are transported to and from the dwell station by the same belt it will be understood that separate transporting means, whether belts or other mechanism may be employed, and that changes in the various elements of the selected embodiment may be made without departing from the spirit and scope of the invention as set forth in the following claims.

I claim:

1. Conveyer mechanism comprising a belt, on which articles are advanced at a predetermined speed, means for deflecting a portion of the belt below the path of travel of the articles, rollers on which the articles are supported above the deflected portion of and are free from the belt, and means for rotating said rollers and thereby advancing the articles thereon at a speed of travel other than that imparted by the belt so that when returned to the belt each article is at least a predetermined distance behind the preceding article.

2. The combination with a conveyer guideway including spaced means by which articles are transported at a predetermined rate of speed, and a dwell station interposed between said means at which station articles are free from said spaced means, of a spacing device mounted at the dwell station by which the traveling articles are retarded temporarily so that when returned to the transporting means to continue their journey they are at least a fixed distance apart.

3. Conveyer mechanism comprising a guideway, means therein by which articles are caused to travel at a predetermined speed, a dwell station to which the articles are fed, and from which they are removed by and at which they are free from said means, and mechanism at the dwell station by which the speed of travel of the articles is reduced so that when removed from the dwell section the articles are at least a predetermined distance apart.

4. Conveyer mechanism comprising a guideway, means therein by which articles are caused to travel at a predetermined speed, a dwell station to which the articles are fed and from which they are removed by and at which they are free from said means, and mechanism at the dwell station by which the speed of travel of the articles is reduced so that when removed from the dwell station the articles are at least a predetermined distance apart, said mechanism including rotatable members and means for rotating said members positively and thereby advancing the articles.

5. Conveyer mechanism comprising a guideway, means therein by which articles are caused to travel at a predetermined speed, a dwell station to which the articles are fed and from which they are removed by said means, and mechanism at the dwell station by which the speed of travel of the articles is changed so that when removed from the dwell station the articles are at least a predetermined distance apart, said mechanism including rotatable members, means for rotating said members and thereby advancing the articles and means for holding the articles in contact with the members.

6. Conveyer mechanism comprising a guideway, means therein by which articles are caused to travel at a predetermined speed, a dwell station to which the articles are fed and from which they are removed by said means, and mechanism at the dwell station by which the speed of travel of the articles is changed so that when removed from the dwell station the articles are at least a predetermined distance apart, said mechanism including rotatable members, means rotating said members and thereby advancing the articles, and rotatable members for holding the articles in contact with the first-named members.

7. Conveyer mechanism comprising a guideway, means therein by which articles are caused to travel at a predetermined speed, a dwell station to which the articles are fed and from which they are removed by said means, and mechanism at the dwell station by which the speed of travel of the articles is changed so that when removed from the dwell station the articles are at least a predetermined distance apart, said mechanism including rotatable members, means rotating said members and thereby advancing the articles and freely rotatable members for yieldably holding the articles in contact with the first-named members.

8. Conveyer mechanism comprising a guideway, means therein by which articles are caused to travel at a predetermined speed, a dwell station to which the articles are fed and from which they are removed by said means, and mechanism at the dwell station by which the speed of travel of the articles is changed so that when removed from the dwell station the articles are at least a predetermined distance apart, said mechanism including rollers, means for rotating the rollers and thereby advancing the articles and yieldably mounted rollers by which the articles are held in contact with the first-named rollers.

9. Conveyer mechanism comprising a guideway, means therein by which articles are caused to travel at a predetermined speed, a dwell station to which the articles are fed and from which they are removed by and at which they are free from said means, and mechanism at the dwell station by which the speed of travel of the articles are reduced so that when removed from the dwell station the articles are at least a predetermined distance apart, said mechanism including rollers on which the articles rest and means for rotating the rollers and thereby advancing the articles at a predetermined speed.

10. Conveyer mechanism comprising a guideway, means therein by which articles are caused to travel at a predetermined speed, a dwell station to which the articles are fed and from which they are removed by said means, and mechanism at the dwell station by which the speed of travel of the articles is changed so that when removed from the dwell station the articles are at least a predetermined distance apart, said mechanism including rollers on which the articles rest, means for rotating the rollers and thereby advancing the articles at a predetermined speed, and means yieldably holding the articles in contact with the rollers.

11. Conveyer mechanism comprising a guideway, means therein by which articles are caused to travel at a predetermined speed, a dwell station to which the articles are fed and from which they are removed by said means, and mechanism at the dwell station by which the speed of travel of the articles is changed so that when removed from the dwell station the articles are at least a predetermined distance apart, said mechanism including rollers on which the articles rest, means for rotating the rollers and thereby advancing the articles at a predetermined speed, and freely rotatable rollers adapted to rest yieldably upon the articles and hold them in contact with the first-named rollers.

12. The conveyer mechanism comprising a guideway, a conveyer belt on the upper run of which the articles rest and are caused to travel through the guideway at a predetermined speed, means intermediate the ends of the belt for depressing a portion of the upper run, rollers, the upper surfaces of which are in the path of travel of the articles, the upper run of the belt being caused by said means to travel below said rollers whereby the articles pass to the rollers from the portion of the belt in advance thereof, and means for driving said rollers to advance the articles thereover independent of said belt and at a speed having a predetermined relation to the speed imparted to the articles by the belt and pass them to the portion of the belt beyond the rollers.

13. Conveyer mechanism comprising a guideway, a conveyer belt on the upper run of which the articles rest and are caused to travel through the guideway at a predetermined speed, means intermediate the ends of the belt for depressing a portion of the upper run, rollers, the upper surfaces of which are in the path of travel of the articles, the upper run of the belt being caused by said means to travel below said rollers, whereby the articles pass to the rollers from the portion of the belt in advance thereof, means yieldably holding the articles in contact with the rollers, and means for driving said rollers to advance the articles at a speed having a predetermined relation to the speed imparted to the articles by the belt and pass them to the portion of the belt beyond the rollers.

14. Conveyer mechanism comprising a guideway, a conveyer belt on the upper run of which the articles rest and are caused to travel through the guideway at a predetermined speed, means intermediate the ends of the belt for depressing a portion of the upper run, rollers, the upper surfaces of which are in the path of travel of the articles, the upper run of the belt being caused by said means to travel below said rollers, whereby the articles pass to the rollers from the portion of the belt in advance thereof, independent means associated with each roller for holding the articles in contact therewith, and means for driving said rollers to advance the articles at a speed having a predetermined relation to the speed imparted to the articles by the belt and pass them to the portion of the belt beyond the rollers.

15. Conveyer mechanism comprising a guideway, a conveyer belt on the upper run of which the articles rest and are caused to travel through the guideway at a predetermined speed, means intermediate the ends of the belt for depressing a portion of the upper run, rollers, the upper surfaces of which are in the path of travel of the articles, the upper run of the belt being caused by said means to travel below said rollers whereby the articles pass to the rollers from the portion of the belt in advance thereof, adjustable means for yieldably holding the articles in contact with the rollers, and means for driving said rollers to advance the articles at a speed having a predetermined relation to the speed imparted to the articles by the belt and pass them to the portion of the belt beyond the rollers.

16. Conveyer mechanism comprising a guideway, a conveyer belt on the upper run of which the articles rest and are caused to travel through the guideway at a predetermined speed, means intermediate the ends of the belt for depressing a portion of the upper run, rollers, the upper surfaces of which are in the path of travel of the articles, the upper run of the belt being caused by said means to travel below said rollers, whereby the articles pass to the rollers from the portion of the belt in advance thereof, independently adjustable means associated with each roller for holding the articles in contact therewith, and means for driving said rollers to advance the articles at a speed having a predetermined relation to the speed imparted to the articles by the belt and pass them to the portion of the belt beyond the rollers.

Signed by me at Syracuse, N. Y., this twenty-seventh day of June, 1930.

CHESTER S. JENNINGS.